US012781465B2

(12) United States Patent
Kolte et al.

(10) Patent No.: US 12,781,465 B2
(45) Date of Patent: Nov. 3, 2026

(54) APPARATUS AND METHOD FOR MAINTENANCE ACCESS ON A WORK MACHINE

(71) Applicant: Deere & Company, Moline, IL (US)

(72) Inventors: Praful A. Kolte, Pune (IN); Mansi I. Kadam, Pune (IN)

(73) Assignee: DEERE & COMPANY, Moline, IL (US)

(*) Notice: Subject to any disclaimer, the term of this patent is extended or adjusted under 35 U.S.C. 154(b) by 254 days.

(21) Appl. No.: 18/675,952

(22) Filed: May 28, 2024

(65) Prior Publication Data

US 2025/0369204 A1 Dec. 4, 2025

(51) Int. Cl.

| | |
|---|---|
| ***B62D 25/24*** | (2006.01) |
| ***B62D 25/20*** | (2006.01) |
| ***E02F 9/08*** | (2006.01) |
| ***E02F 9/16*** | (2006.01) |

(52) U.S. Cl.

CPC ............ *E02F 9/0833* (2013.01); *B62D 25/20* (2013.01); *B62D 25/24* (2013.01); *E02F 9/163* (2013.01)

(58) Field of Classification Search

CPC ......... E02F 9/0833; E02F 9/163; E02F 9/166; E02F 9/16; B62D 25/20; B62D 25/24; B62D 33/06; B62D 33/0617; B62D 33/063; B62D 33/067; B62D 33/073

USPC .... 296/190.08, 190.11, 191, 190.01, 190.04, 296/190.05, 193.07, 39.1, 75, 97.23

See application file for complete search history.

(56) References Cited

U.S. PATENT DOCUMENTS

| | | | | |
|---|---|---|---|---|
| 2,520,508 A | | 8/1950 | Morrison | |
| 4,074,788 A | * | 2/1978 | Joubert | B60J 5/0487 292/259 R |
| 5,520,500 A | | 5/1996 | McIlwain et al. | |
| 9,193,396 B2 | | 11/2015 | Davisdon et al. | |
| 9,796,311 B2 | | 10/2017 | Veik et al. | |
| 10,190,286 B2 | | 1/2019 | Konrardy et al. | |
| 11,110,969 B2 | * | 9/2021 | Rettick | E02F 9/16 |
| 11,745,808 B2 | * | 9/2023 | Shoen | B60N 2/38 296/97.23 |
| 2004/0100113 A1 | * | 5/2004 | Katz | B60N 2/3011 296/65.09 |
| 2015/0176248 A1 | * | 6/2015 | Horikawa | E02F 9/16 296/97.23 |

(Continued)

FOREIGN PATENT DOCUMENTS

| | | |
|---|---|---|
| DE | 102014205211 B4 | 3/2020 |
| DE | 102016101548 B4 | 7/2022 |
| DE | 102022124725 A1 | 3/2023 |

*Primary Examiner* — Roger L Pang

(57) ABSTRACT

A work machine includes a frame, a cab, and a hinge mechanism coupling the cab to the frame and enables rotation of the cab upwards to expose a frame surface with an access assembly for accessing the internal components. The access assembly includes a pair of brackets coupled to the frame and a removable cover panel. The brackets are positioned adjacent an access aperture on the frame surface. The cover panel includes a rod on an adjacent edge thereof and flush with a bottom surface of the cover panel. The rod passes into the brackets when an opposite edge of the cover panel is raised to bring portions of the rod and cover panel into the brackets. The rod settles into the brackets when the opposite edge of the cover panel is subsequently lowered to engage a ledge on a portion of a perimeter of the access aperture.

19 Claims, 10 Drawing Sheets

(56) References Cited

U.S. PATENT DOCUMENTS

| | | | | |
|---|---|---|---|---|
| 2022/0402560 | A1* | 12/2022 | Hara | B62D 25/20 |
| 2023/0099512 | A1 | 3/2023 | Harmon et al. | |

* cited by examiner

APPARATUS AND METHOD FOR MAINTENANCE ACCESS ON A WORK MACHINE

TECHNICAL FIELD

The present disclosure relates generally to an apparatus and method for maintenance access on smaller work machines, specifically wherein the cab lifts above the frame for maintenance.

BACKGROUND

Smaller work machines such as skid steer loaders and compact track loaders are known to be agile, compact-type work machines with a high degree of maneuverability and a wide range of application in the industrial, agricultural, and construction fields. The work machines typically include a frame, boom assembly and an operator cab. For convenient access to the transmission compartment, the engine, and various drive components for servicing and repair, the cab in some configurations may rotate or lift upwards to expose a metal sheet bolted to a top surface of the frame. However, because of the compactness of these smaller work machines, and the complexity of the assembly, alongside the inherent obstructions to access caused by the boom assembly, maintenance becomes Inconvenient, especially when worked in the field. Therein lies an opportunity to improve the accessibility and efficiency of the maintenance of internal components on a work machine.

SUMMARY

According to an aspect of the present disclosure, a work machine with a method and apparatus for maintenance access is disclosed. The work machine includes a frame, a cab, and a hinge mechanism. The hinge mechanism couples the cab to the frame and selectively enables rotation of the cab upwards about an axis of the frame wherein upward rotation of the cab about the axis exposes a a frame surface with an access assembly for accessing the internal components of the frame. Downward rotation of the cab about the axis disposes the cab atop the frame. The access assembly includes a pair of brackets and a removable cover panel. The brackets have coaxial axes to one another and are positioned adjacent an access aperture on the frame surface. The removable cover panel has a rod on an adjacent edge thereof and flush with a bottom surface of the cover panel. The rod axis is parallel to the coaxial axes of the pair of brackets. The rod passes into the brackets when an opposite edge of the cover panel is raised to bring portions of the rod and the cover panel into the brackets. The rod settles into the brackets when the opposite edge of the cover panel is subsequently lowered to engage a ledge on a portion of a perimeter of the access aperture. The access assembly supports a footwell base for the cab. The cover panel comprises a first panel portion, and a second panel portion connected to the first panel portion to create an L-shape.

The work machine may further include a removable protective floor liner coupled to a top surface of the cover panel wherein the protective floor liner creates a portion of the footwell base. The floor liner may further comprise of a first footrest and a second footrest on opposing sides of the protective floor liner.

The locking mechanism secures the cover panel to the frame and includes two quick detach locks on opposing edges of the cover panel. The opposing edge transverse to the longitudinal axis of the frame.

Each bracket comprises a recess with sides slanted downwardly toward the center axis of the recess of the bracket at an acute angle relative to a horizontal plane defined by the cover panel. Each bracket further comprises an upper extending arm to limit upward movement of the cover panel once inserted. The access assembly further comprises a throttle pedal aperture.

A method of accessing the internal components of a frame beneath the cab on a work machine include the following steps. In a first step, the method includes rotating a cab upwards about an axis of the frame wherein upward rotation of the cab about the axis exposes a frame surface with an access assembly for the internal component of the frame. The access assembly includes a pair of brackets coupled to the frame and a removable cover panel. Next, the method includes removing a protective floor liner to expose the cover panel. The protective floor liner is coupled to a top surface of the frame wherein the protective floor liner creates the footwell base of the cab. Then the method includes unlocking a locking mechanism to secure a removable cover panel to the frame. The locking mechanism includes a first detach lock and a second detach lock on opposing edges of the cover panel wherein the opposing edges are transverse to the longitudinal axis of the frame. In a next step, the method includes raising an edge of the cover panel to engage a ledge on a portion of a perimeter of an access aperture. The cover panel has a rod fixedly coupled to an opposing edge thereof with the rod flush with the bottom surface of the cover panel. The rod axis is parallel to the coaxial axes of the pair of brackets when settled into the brackets. In another step, the method includes pulling the rod and the cover panel out of the bracket when the cover panel is raised to disengage from the brackets. In this method, the cover panel comprises a first panel portion and a second panel portion connected to the first panel portion to create an L-shape. Finally, the method may further include reinstalling the cover panel by passing the rod into the brackets when the edge of the cover panel opposite the rod is raised, and settling the rod into the brackets when the edge of the cover panel is subsequently lowered to engage a ledge on a portion of a perimeter of the access aperture.

Other features and aspects will become apparent by consideration of the detailed description, claims, and accompanying drawings.

BRIEF DESCRIPTION OF THE DRAWINGS

The detailed description of the drawings refers to the accompanying figures.

Figure 3:
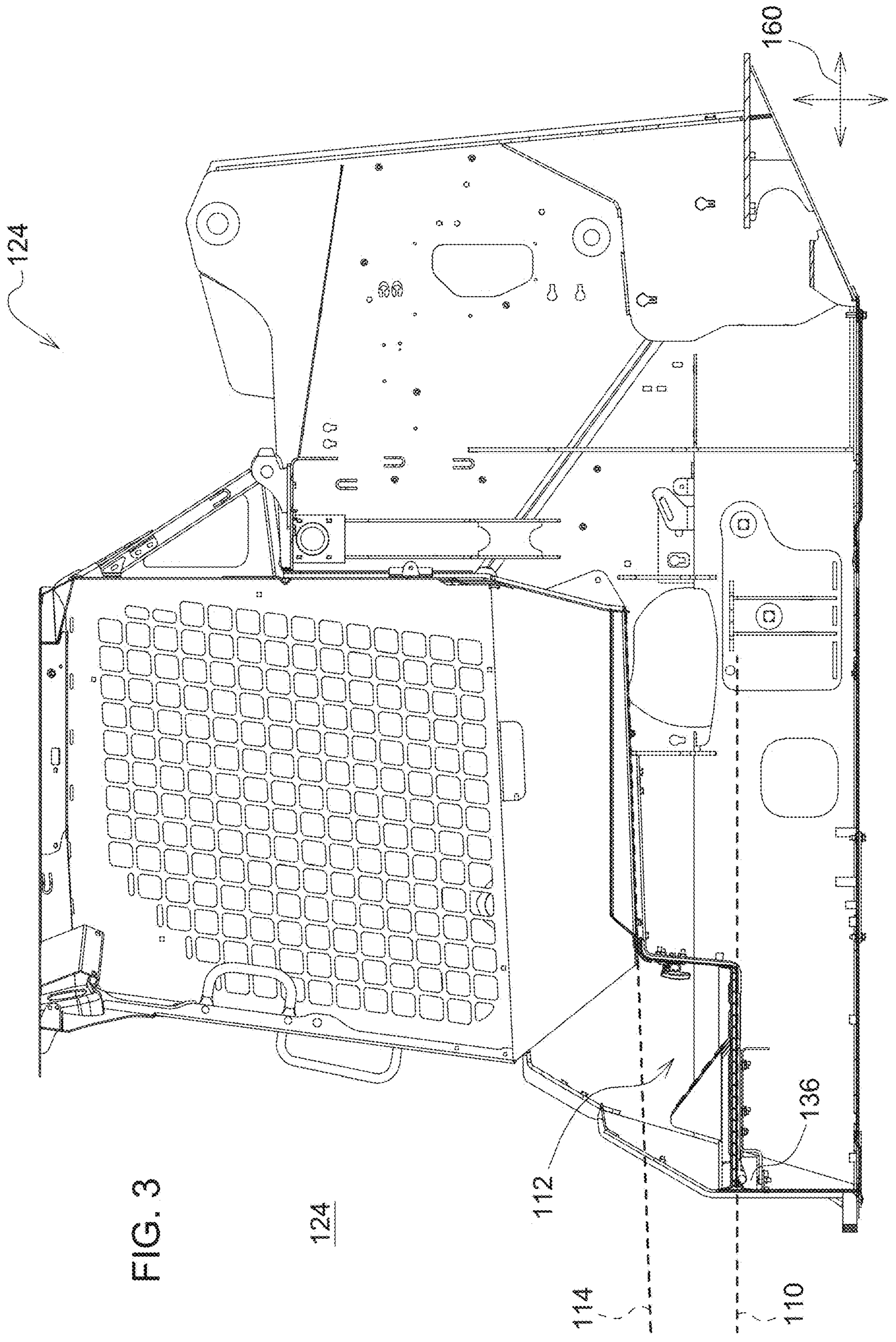
FIG. 3 is a side view of a portion of the front of the work machine with the cab.

FIG. **4*a* is a cross-sectional view of a portion of a FIG. 3** with the cover panel in a closed position.

Figure 4A:
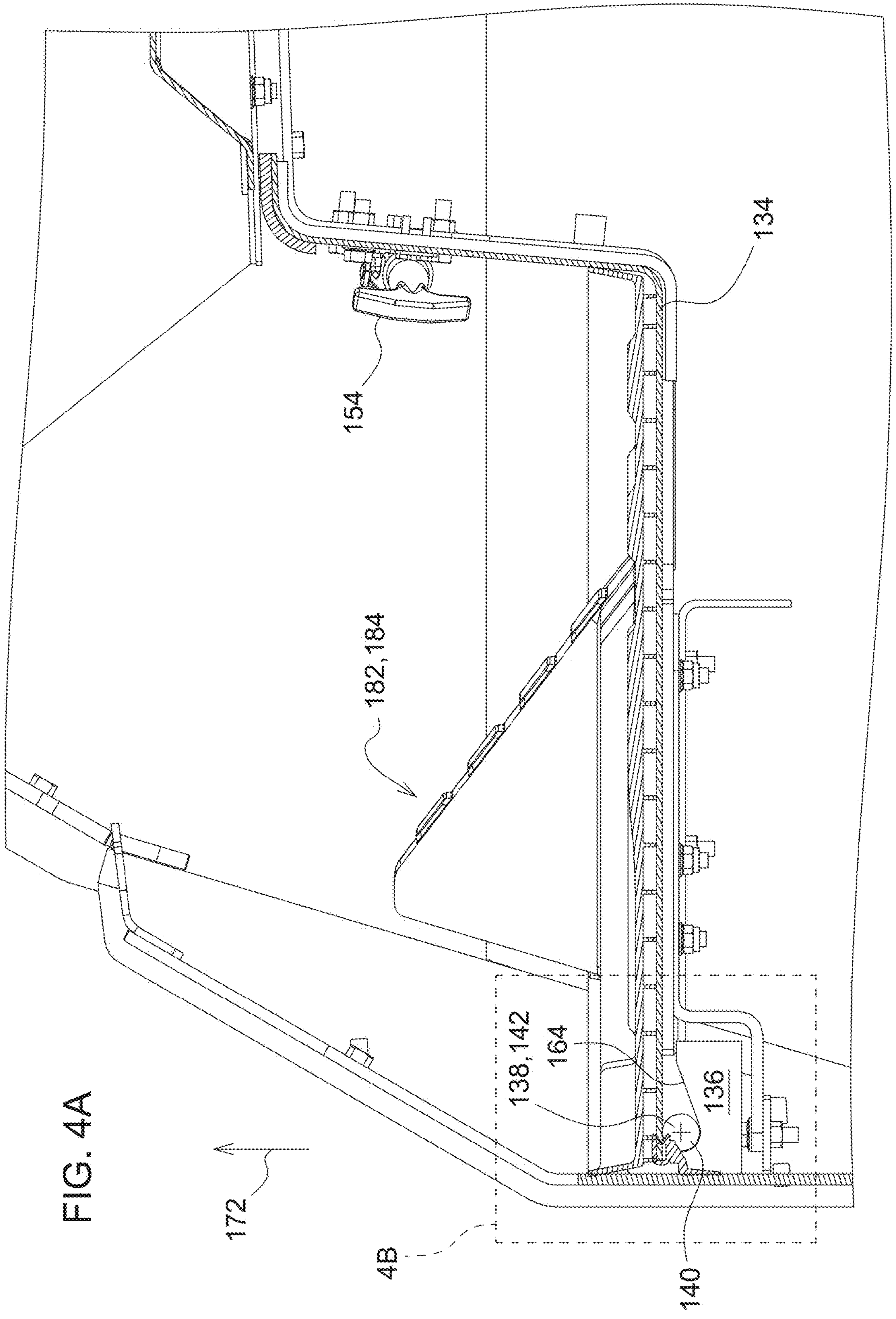

FIG. **4*b* is a detailed view of a portion of FIG. 4*a***.

FIG. **4*c* is a detailed side view of a portion of a FIG. 3** with the cover panel rotated upwards for detaching from the frame and the protective floor liner dissassembled.

Figure 5:
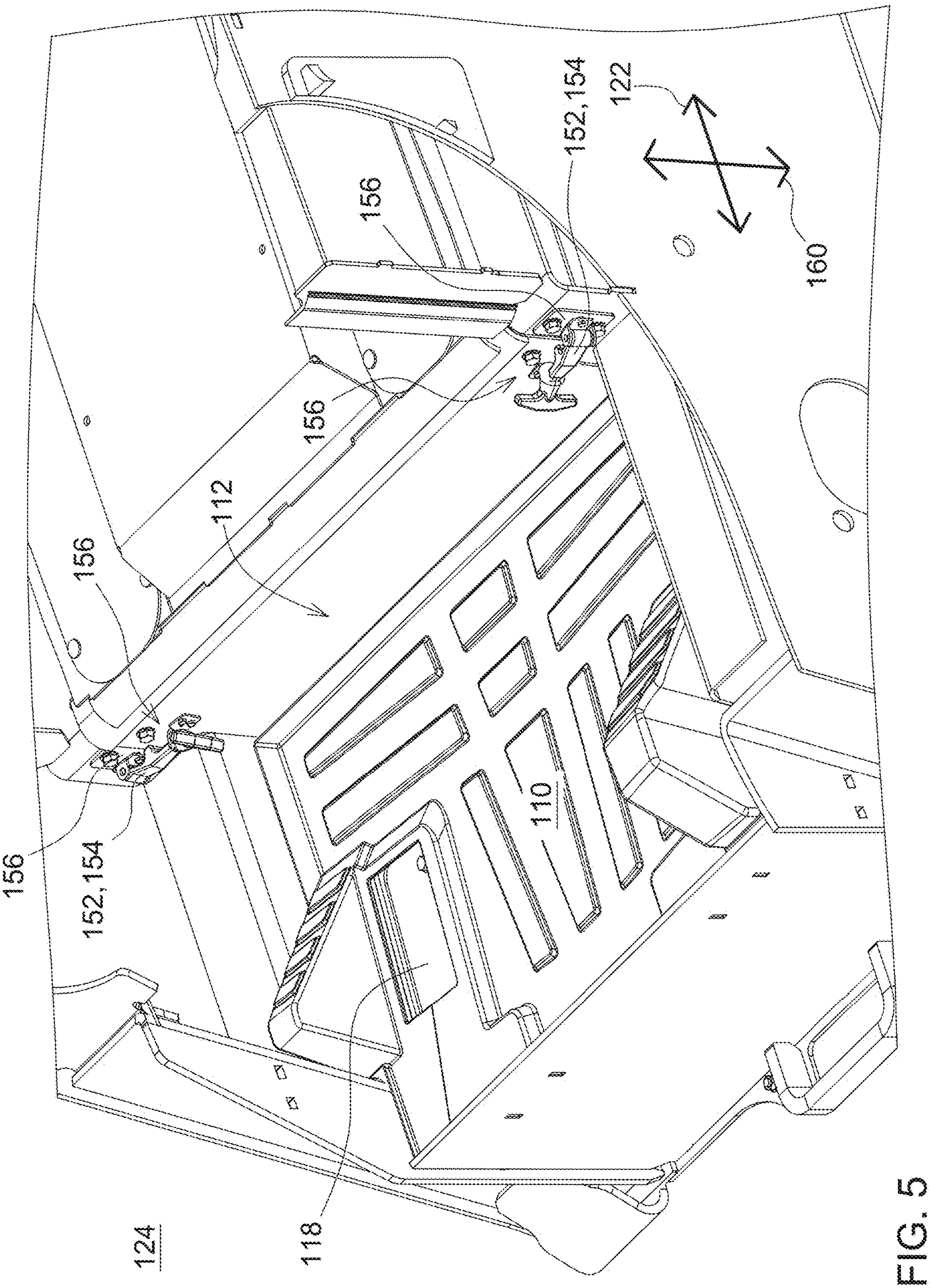

FIG. 5 is perspective front view of the footwell assembly.

Figure 6:
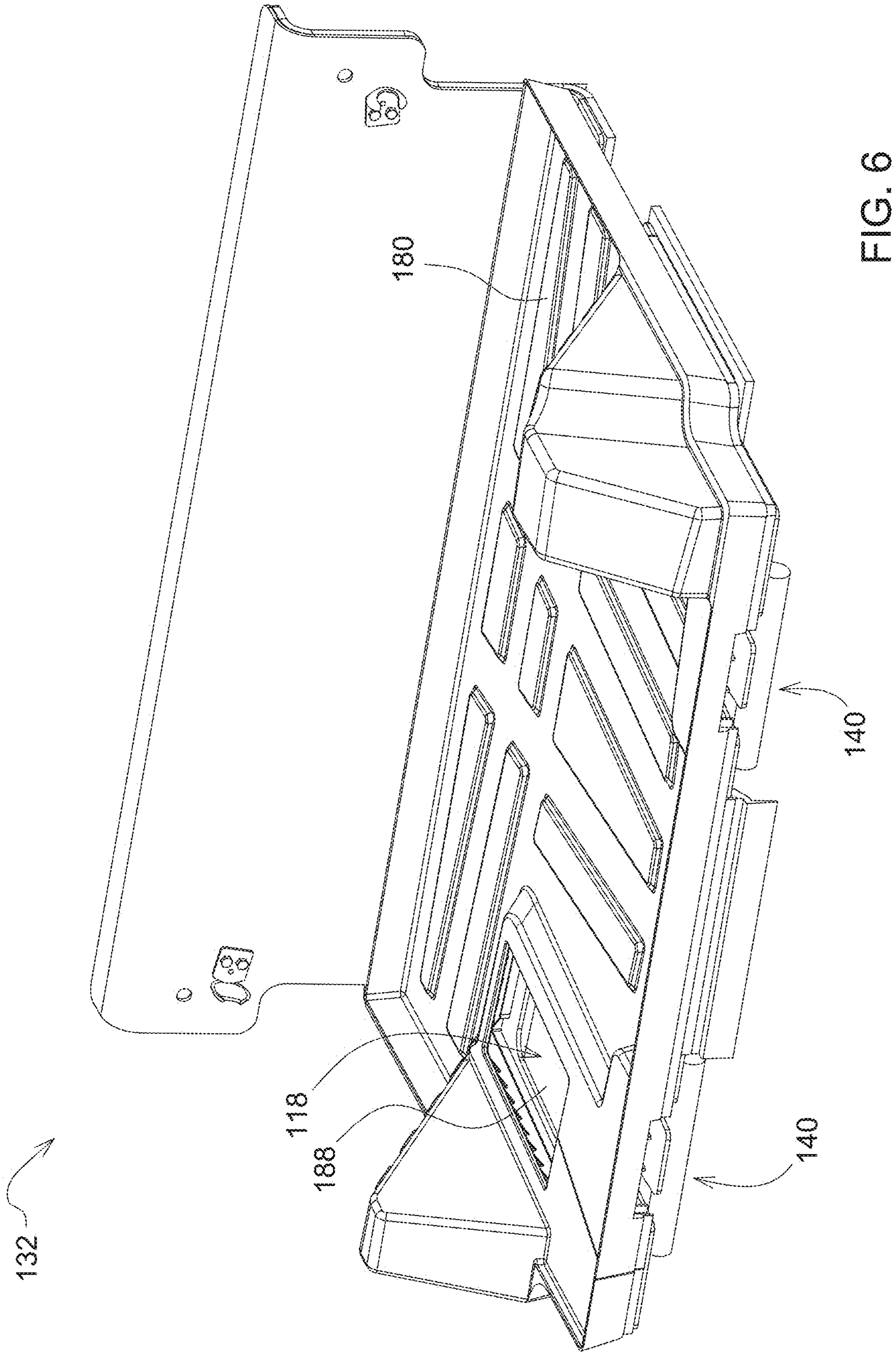

FIG. 6 is perspective top view of the footwell assembly.

Figure 7:
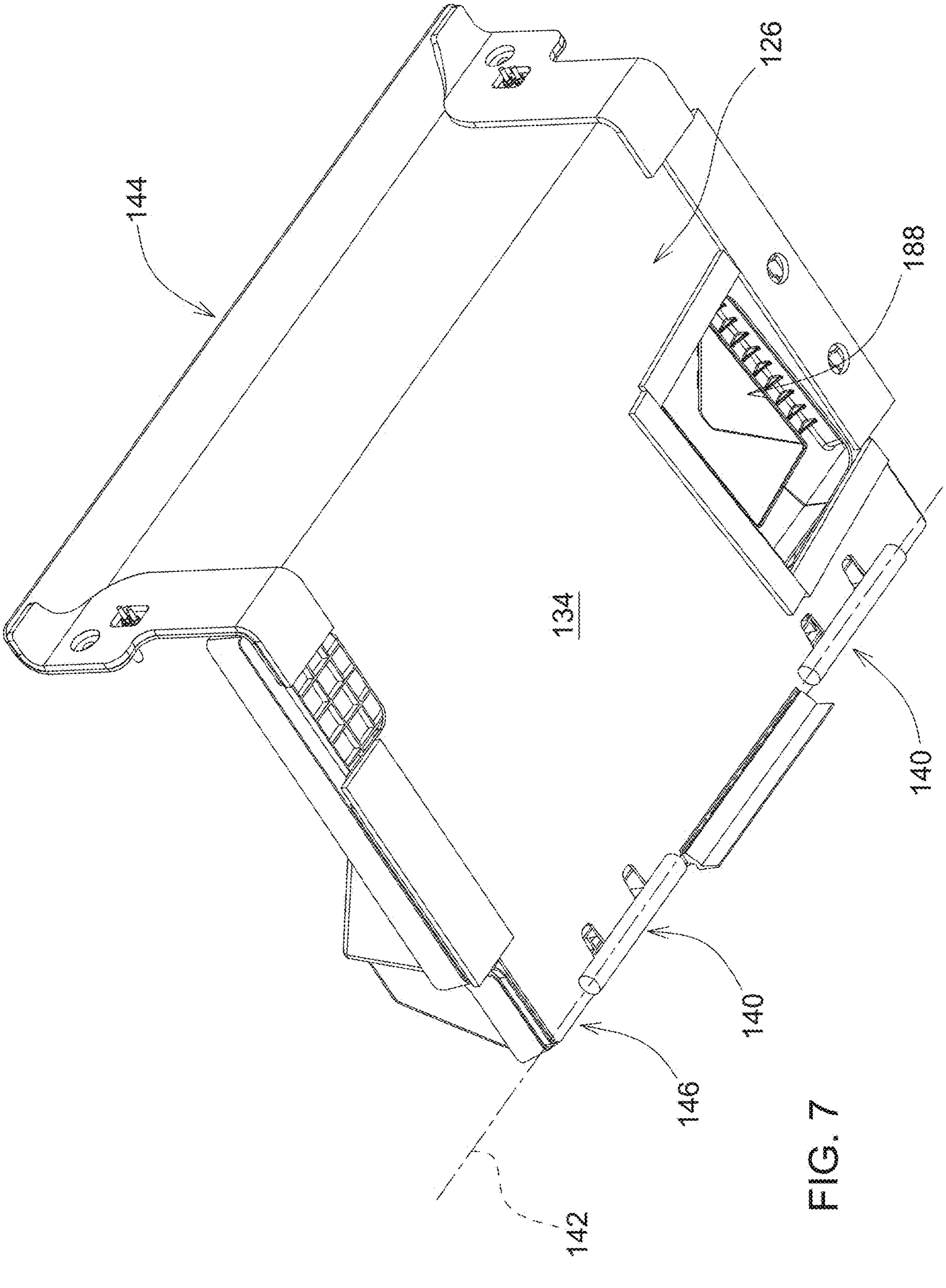

FIG. 7 is a perspective bottom view of the footwell assembly.

Figure 8:
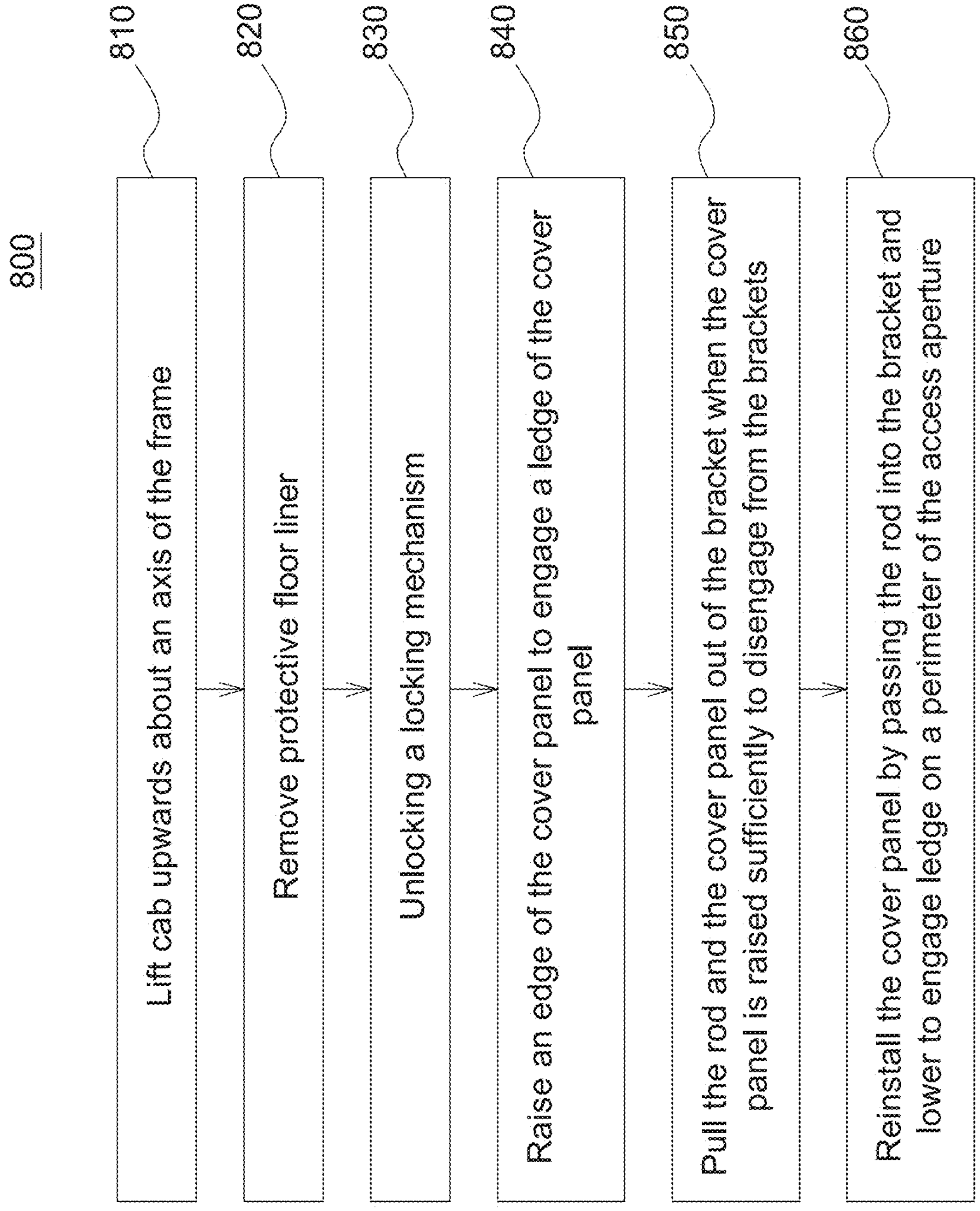

FIG. 8 is a flowchart of a method of accessing internal components of a frame on a work machine.

Like reference numerals are used to indicate like elements throughout the several figures.

DETAILED DESCRIPTION

Figure 1:
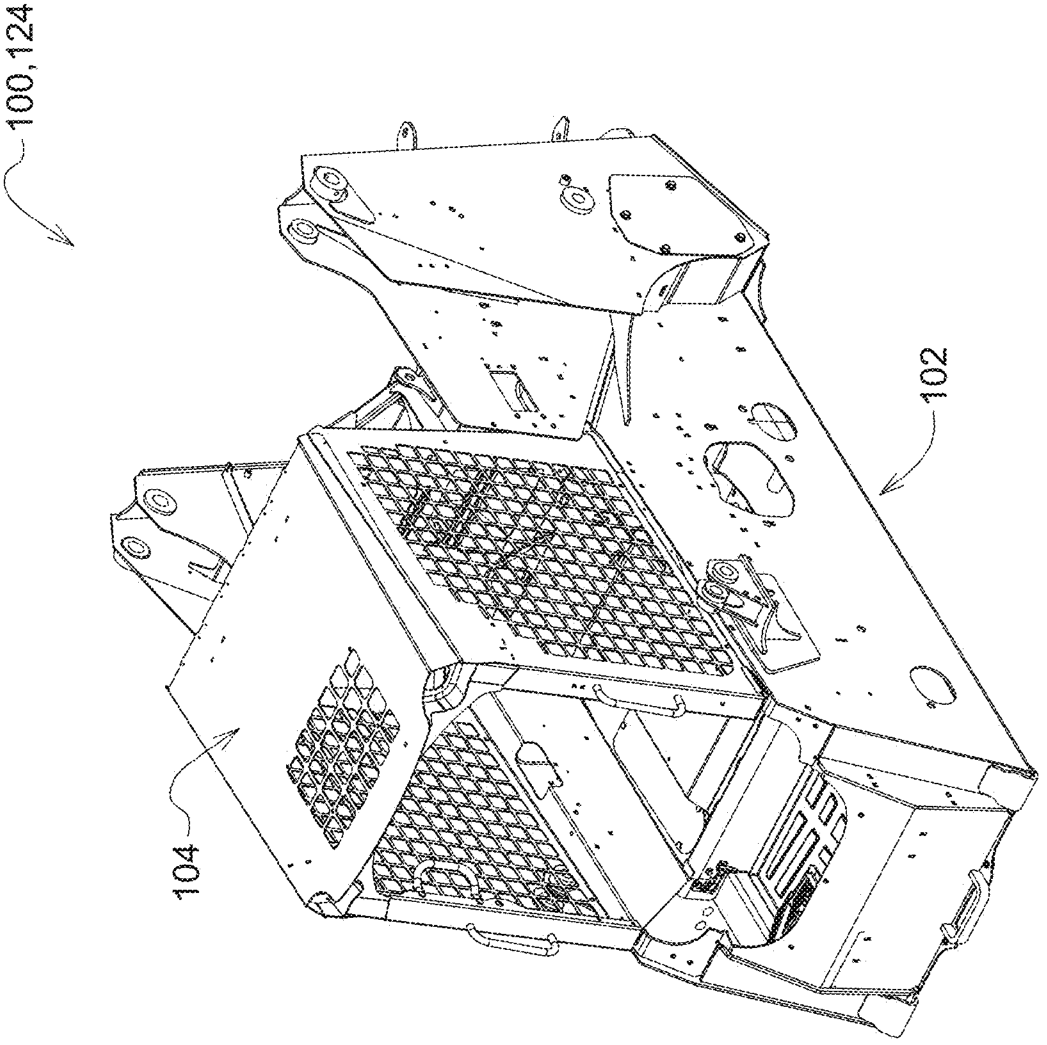
FIG. 1 is a left side elevation view of a portion of a work machine with a cab in an operation position.
Figure 2:
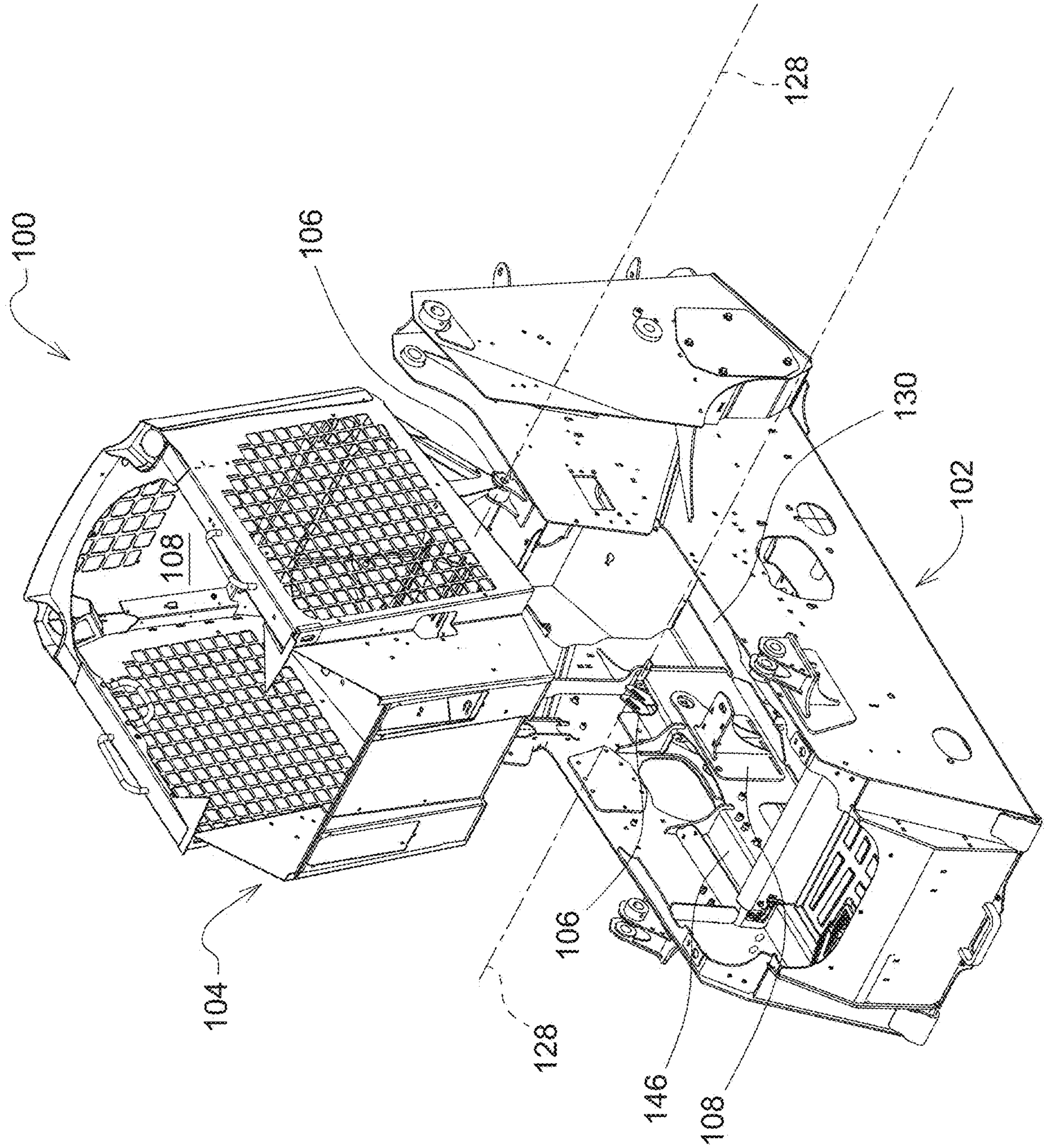
FIG. 2 is a left side elevation view of a portion of a work machine with a cab in a service position.

FIG. 1 illustrates a portion of a work machine 100 as a skid steer, comprising a frame 102, a cab 104, and a hinge mechanism 106 with the cab in the operative position 124. The work machine 100 may be a frame 102 with a pivotally connected cab 104. Work machine 100 is illustrated as skid steer, but can also be other small scale work machines such as compact track loaders, tractors, etc.

Figure 4B:
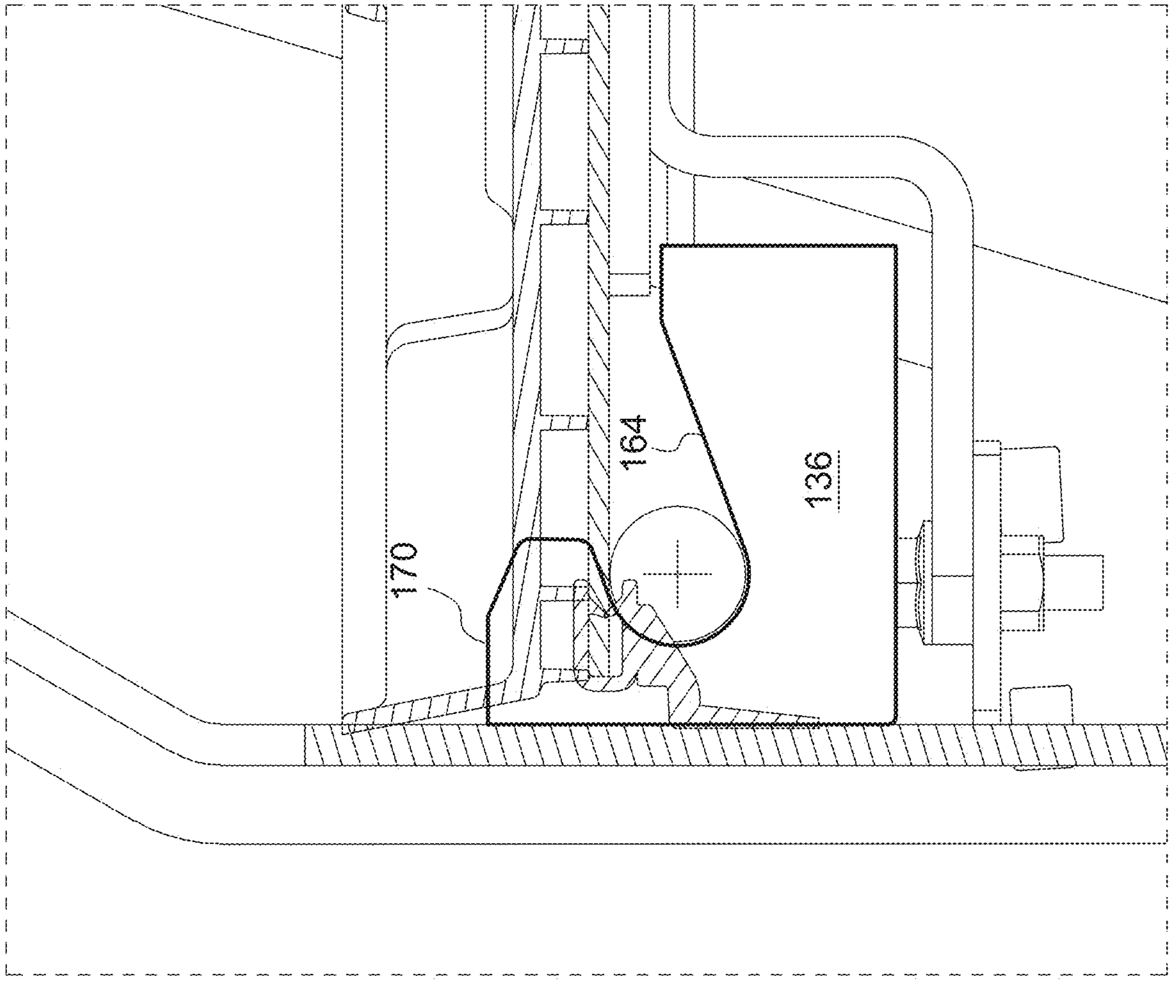
Figure 4C:
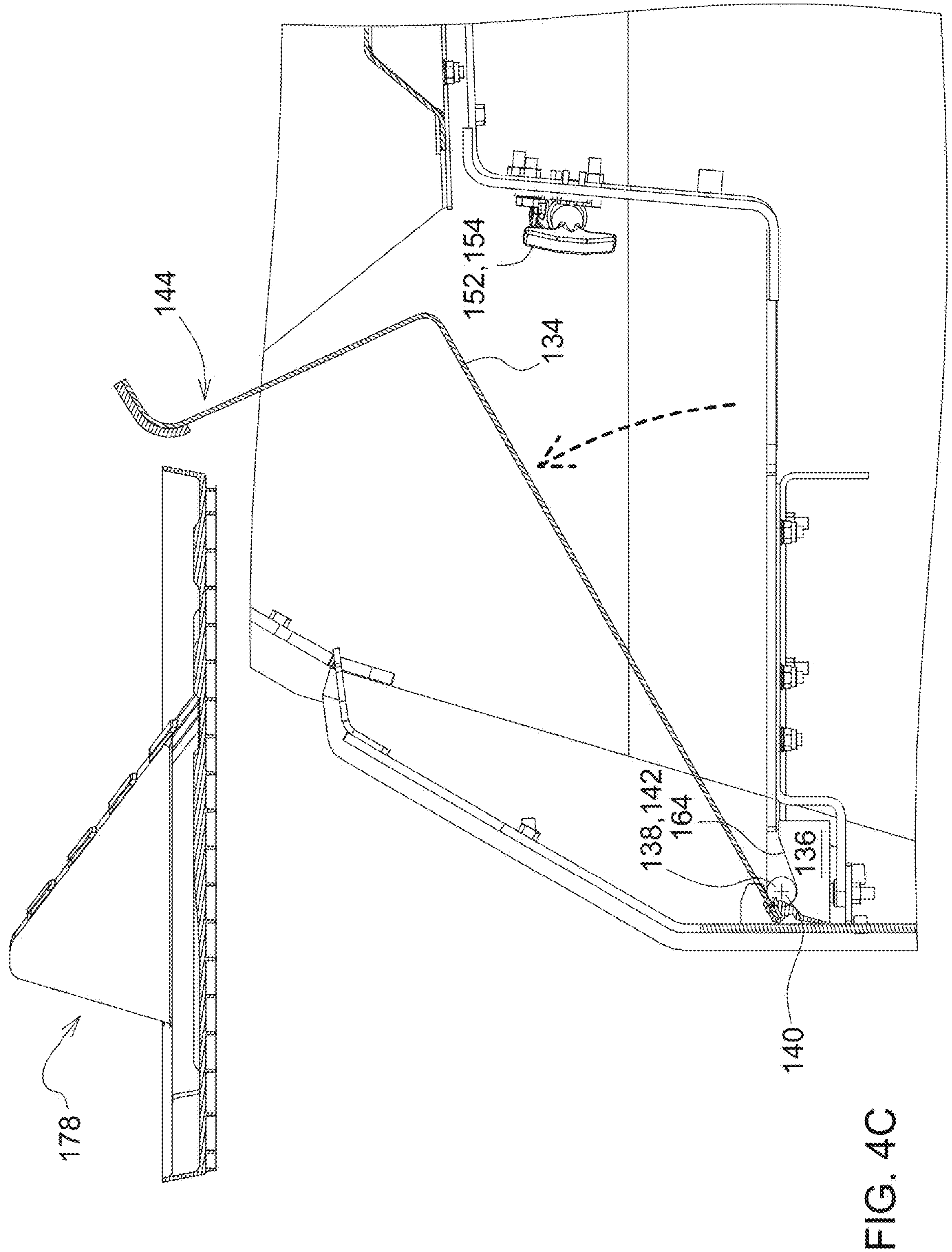

The cab 104 comprises a roof, a floor 110 with a defined a footwell 112 (identified in FIGS. 3-5). A plurality of windows extends between the floor 110 and the roof, and together with the floor 110 and the roof define an operator compartment that is enclosed on sides. An operator seat is supported on the floor 110 and disposed within the cab. The footwell 112 is disposed within the cab 104 and may extend below a first plane 114 (as shown in FIG. 3) parallel to the floor 110 of the footwell 112 of the cab 104. The footwell 112 comprises of a plurality of walls extending below the first plane 114 and a base (i.e. the floor 110) to create a pit. throttle pedal aperture 118 exists within the footwell 112 for the installation of the throttle pedal in the cab 104. In an alternative embodiment, the floor 110 of the footwell 112 (previously referred to also as the base) may be acutely angled from the first plane 114. Beneath the cab 104 are housed the work machine's internal components 120 such as a hydrostatic transmission; steering linkages; hydraulic lines and valves for powering the lift arms, buckets, and auxiliary functions; motor lines, batteries if electric, miscellaneous wiring connections and harnesses. The footwell 112 is the designated area within the cab 104 where the operator places their feet while seated during operation and is typically designed for comfort, safety, and efficient operation of the work machine.

Cab 104 pivotally connects to the frame 102 via hinge mechanisms 106 located underneath, towards the bottom and rear 122 of the cab. The operative position 124 shown in FIG. 1 is the configuration used for normal operations such as grading a surface. The floor 110 of the cab 104 is positioned approximately parallel to a top surface of the frame 102 of the work machine 100. The hinge mechanism 106 selectively enables rotation of the cab 104 upwards about an axis 128 of the hinge mechanism 106 wherein upward rotation or a lifting upwards of the cab 104 about the axis 128 exposes a frame surface 130 with an access assembly 132 (shown in FIG. 26) for accessing the internal components 120 (not shown) within the frame 102. Downward rotation or lowering of the cab 104 about the axis 128 disposes the cab 104 atop the frame 102 in the operative position 124. Means for accessing the components 120 under the cab typically require connecting coupling a cover through connecting mechanisms such as fasteners that require tooling, such as nuts and bolts, thereby making the task more arduous. The access assembly 132 from the figures as shown include a pair of brackets 136 having coaxial axes 138 wherein the brackets 136 are coupled to the frame 102, wherein the. The brackets 136 are positioned adjacent an access aperture 108 on the frame surface 130. The access assembly 132 further comprises a removable cover panel 134 having a rod 140 coupled to at least near an edge thereof and flush with a bottom surface 126 of the cover panel 134. The rod 140 is formed integrally to the cover through weld, casting, fasteners, or molding, to name a few. The rod axis 142 is parallel or substantially parallel to the coaxial axes 138 of the pair of brackets 136.

The rod 140 passes into the brackets 136 when the opposite edge 144 of the cover panel 144134 is raised (as shown by an arrow in FIG. 4B) to bring portions of the rod 140 and the cover panel 134 into the brackets 136. The rod 140 settles into the brackets 136 when the opposite edge 144 of the cover panel 134 is subsequently lowered to lay flat against the frame 102. In the embodiment shown, the cover panel 134 is lowered to engage a portion of a ledge 146 of the frame 102 along at least a portion of the perimeter of the access aperture 108. The cover panel 134 advantageously enables the operator to "drop" the cover panel 134 into position, allowing for the panel 134 to be substantially secured by weight alone. This is contrary to current commercial designs wherein the maintenance access doors require the removal of a multiple of screw type fasteners using a tool wherein the fasteners secure the maintenance access door into position.

The cover panel 134 of the access assembly 132 supports the footwell base 150 of the cab 104. The access assembly 132 further comprises a locking mechanism 152 to secure the cover panel 134 to the frame 102. The locking mechanism 152 includes two quick detach locks 154 on opposing edges 156 of the cover panel 134 wherein the opposing edges 156 are transverse to the longitudinal axis 160 of the frame 102. A quick detach latch 154 is a mechanical device designed for securing and releasing two components rapidly and easily, without the need for additional tools or equipment. It enables users to connect and disconnect components with minimal effort, providing a convenient and efficient method for assembling, disassembling, or adjusting various systems or structures. The key features of a quick detach latch 154 include a latch body, a locking mechanism 154, an actuation mechanism, and a biasing member. The latch body is typically attached to the frame and houses the locking mechanism 154 and actuation mechanism. It can be made from durable materials such as metal, plastic, or a combination thereof, offering strength and resistance to wear and corrosion. The locking mechanism consists of a locking element that selectively engages and disengages with a mating element on the cover panel. The locking element can be a hook, pin, or bolt, while the mating elements can be an aperture, slot, or recess. The actuation mechanism is operatively connected to the locking mechanism 154 and is accessible from the exterior of the latch body. It facilitates the selective engagement and disengagement of the locking element with the mating element.

The actuation mechanism can be a lever, button, or handle that is pivotally or slideably connected to the latch body, thereby allowing users to actuator the locking mechanism with minimal force. A biasing member, such as a spring, exerts force on the locking mechanism, urging the locking element into engagement with the mating element when the actuation mechanism is not actuated. This ensures a secure connection between the components when the latch is not being actively disengaged. The access assembly 132 advantageously provides a quick and tool-less apparatus to efficiently access internal components of the work machine with reduced downtime and labor requirements.

Each bracket comprises a recess 162 with sides 164 slanted downwardly toward the center axis 166 of a recess of the bracket at an acute angle 168 relative to a horizontal plane (e.g. a horizontal plane defined by the cover panel 134.

Each bracket 136 further comprises an upper extending arm 170 to limit upward movement 172 (as identified by the arrow) of the cover panel 134, once inserted. The cover panel 134 is limited in movement in along the longitudinal axis of the frame and transverse to the longitudinal axis of the frame by connecting the the ledge 146 along at least a portion of the perimeter of the access aperture 108 once the cover panel 134 is inserted or "dropped" into place.

The cover panel 134 may comprise of a first panel portion 174, and a second panel portion 176 connected to the first panel portion 174 to create an L-shape. The cover panel 134 generally follows the contour of the floor 110 of the cab and therefore can advantageously be constructed as a single piece panel through a stamping, molding, or laser cut means. Furthermore, the single piece panel allows for a singular large space that extends transverse to the fore-aft direction for the footwell 112, and to accommodate an operator's legs and feet in a natural, relaxed position, helping to reduce fatigue during long hours of operation.

The removable protective floor liner 178 is coupled to a top surface 180 of the cover panel 134. The protective floor liner 178 comprises of a first footrest 182 and a second footrest 184 on opposing sides of the protective floor liner 178. The footrest(s) may be adjacent to foot controls such as foot pedals (not shown) or levers, for operating various functions of the work machine 100, including propulsion, steering, and attachment control. The top surface 180 of removable protective floor liner 178 comprises of a non-slip surface and features raised patterns to provide traction and prevent the operator's feet from slipping during operation. A substantially similar in size aperture 188 in the removable protective floor liner coincides with throttle pedal aperture 118 in the cover panel 134. This provides space for installing the throttle pedal within the cab while coupled to cables located within the frame. Furthermore, the removable protective flow liner may provide drainage channels (not shown) or holes to allow water, mud, or debris to exit the cab 104 for keeping the floor 110 clean and dry.

Furthermore, a method 800 of accessing the internal components of the frame 102 beneath the cab on a work machine is shown schematically in FIG. 8. In a first step 810, the method includes lifting a cab 104 upwards about an axis of the frame 102 wherein upward rotation of the cab about the axis exposes a frame surface with an access assembly for the internal component of the frame. The cab 104 may be supported by support legs which enable the cab to lock into the elevated position. The access assembly 132 includes a pair of brackets 136 coupled to the frame 102 and a removable cover panel 134. In a step 820, the method includes removing a protective floor liner 178 to expose the cover panel 134. The protective floor liner 178 is coupled to a top surface 130 of the frame 102 wherein the protective floor liner 178 creates the footwell base 150 of the cab 104. In step 830, the method includes unlocking a locking mechanism 152 that secures a removable cover panel 134 to the frame 102. The locking mechanism 152 includes a first detach lock 154*a* and a second detach lock 154*b* on opposing edges 156 of the cover panel 134 wherein the opposing edges 156 are transverse to the longitudinal axis 160 of the frame 102. In step 840, the method includes raising an edge of the cover panel 134 to engage a ledge 146 on a portion of a perimeter of an access aperture or maintenance access aperture 108. The cover panel 134 has a rod 140 fixedly coupled to an opposing edge thereof with the rod 140 flush with the bottom surface 126 of the cover panel 134. The rod axis 142 is parallel to the coaxial axes 138 of the pair of brackets 136 when settled into the brackets. In step 850, the method includes pulling the rod 140 and the cover panel 134 out of the bracket 136 when the cover panel 134 is raised to disengage from the brackets 136. In this method, the cover panel 134 comprises a first panel portion 174 and a second panel portion 176 connected to the first panel portion 174 to create an L-shape. In step 860, the method may further include reinstalling the cover panel 134 by passing the rod 140 into the brackets 136 when the edge of the cover panel 144 opposite the rod 140 is raised, and settling the rod 140 into the brackets 136 when the edge of the cover panel 144 is subsequently lowered to engage a ledge 146 on a portion of a perimeter of the access aperture 108.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A work machine comprising:

a frame;

a cab; and a hinge mechanism coupling the cab to the frame, the hinge mechanism selectively enabling rotation of the cab upwards about an axis of the frame wherein upward rotation of the cab about the axis exposes a frame surface with an access assembly for accessing the internal components of the frame, and wherein downward rotation of the cab about the axis disposes the cab atop the frame;

wherein the access assembly includes a pair of brackets coupled to the frame, the brackets having coaxial axes to one another, the brackets positioned adjacent an access aperture on the frame surface, and a removable cover panel having a rod on an adjacent edge thereof and flush with a bottom surface of the cover panel, a rod axis being parallel to the coaxial axes of the pair of brackets, the rod passing into the brackets when an opposite edge of the cover panel is raised to bring portions of the rod and the cover panel into the brackets, the rod settling into the brackets when the opposite edge of the cover panel is subsequently lowered to engage a ledge on a portion of a perimeter of the access aperture.

2. The work machine of claim 1, wherein the cover panel of the access assembly supports a footwell base for the cab.

3. The work machine of claim 1, wherein the cover panel comprises:

a first panel portion; and a second panel portion connected to the first panel portion to create an L-shape.

4. The work machine of claim 2 further comprising:

a removable protective floor liner coupled to a top surface of the cover panel, the protective floor liner creating a portion of the footwell base.

5. The work machine of claim 4, wherein the protective floor liner comprises a first footrest and a second footrest on opposing sides of the protective floor liner.

6. The work machine of claim 3, wherein the access assembly further comprises:

a locking mechanism to secure the cover panel to the frame, the locking mechanism including two quick detach locks on opposing edges of the cover panel, the opposing edges transverse to a longitudinal axis of the frame.

7. The work machine of claim 1, wherein each bracket comprises a recess with sides slanted downwardly toward a center axis of the recess of the bracket at an acute angle relative to a horizontal plane defined by the cover panel.

8. The work machine of claim 7, wherein each bracket further comprises an upper extending arm to limit upward movement of the cover panel once inserted.

9. The work machine of claim 8, wherein the access assembly further comprises a throttle pedal aperture.

10. An access assembly for accessing internal components of a frame of a work machine, the access assembly comprising:

a pair of brackets with a base portion coupled to the frame adjacent to an access aperture, each bracket having a support arm extending from the base portion, the support arms each having a coaxial axes to one another;

a removable cover panel having a rod fixedly coupled adjacent an edge thereof and flush with a bottom surface of the cover panel, a rod axis being parallel to the coaxial axes of the brackets, the rod passing into the brackets when an opposite edge of the cover panel is raised to bring portions of the rod and the cover panel into the brackets, the rod settling into the brackets when the opposite edge of the cover panel is subsequently lowered to engage a portion of a ledge on a perimeter of a perimeter of the access aperture, wherein the cover panel comprises a first panel portion; and a second panel portion connected to the first panel portion to create an L-shape.

11. The access assembly of claim 10, wherein the cover panel of the access assembly supports a footwell base for a cab.

12. The access assembly of claim 11 further comprising a removable protective floor liner coupled to a top surface of the cover panel, the protective floor liner creating a portion of the footwell base.

13. The access assembly of claim 12, wherein the protective floor liner comprises a first footrest and a second footrest on opposing sides of the protective floor liner.

14. The access assembly of claim 10 further comprising:

a locking mechanism to secure the cover panel to the frame, the locking mechanism including two quick detach locks on opposing edges of the cover panel, the opposing edges transverse to the longitudinal axis of the frame.

15. A method of accessing the internal components of a frame beneath a cab on a work machine, the method comprising: rotating a cab upwards about an axis of the frame wherein upward rotation of the cab about the axis of the frame exposes a frame surface with an access assembly for accessing an internal component of the frame, wherein the access assembly includes a pair of brackets coupled to the frame and a removable cover panel; removing a protective floor liner to expose the cover panel, the protective floor liner coupled to a top surface of the frame, the protective floor liner creating a footwell base of the cab; unlocking a locking mechanism that secures the removable cover panel to the frame, the locking mechanism including a first detach lock and a second detach lock on opposing edges of the cover panel, the opposing edges transverse to the longitudinal axis of the frame; raising an edge of the cover panel engaging a ledge on a portion of a perimeter of an access aperture, the cover panel having a rod fixedly coupled to an opposing edge thereof with the rod flush with the bottom surface of the cover panel, and the rod axis being parallel to the coaxial axes of the pair of brackets when settled into the brackets; and pulling the rod and the cover panel out of the brackets when the cover panel is raised to disengage from the brackets.

16. The method of claim 15 wherein the cover panel comprises:

a first panel portion; and a second panel portion connected to the first panel portion to create an L-shape.

17. The method of claim 15, wherein the protective floor liner comprises a first footrest and a second footrest on opposing sides of the protective floor liner.

18. The method of claim 15, wherein each bracket comprises a recess with sides slanted downwardly toward a center axis of the recess of the bracket at an acute angle relative to a horizontal plane defined by the cover panel.

19. The method of claim 15 further comprising:

reinstalling the cover panel by passing the rod into the brackets when the edge of the cover panel opposite the rod is raised;

settling the rod into the brackets when the edge of the cover panel is subsequently lowered to engage a ledge on a portion of a perimeter of the access aperture.

* * * * *